Dec. 11, 1962 C. F. ROMENS ET AL 3,067,443
LIGHTWEIGHT FITTING CLEANING MACHINES
Filed Jan. 9, 1961
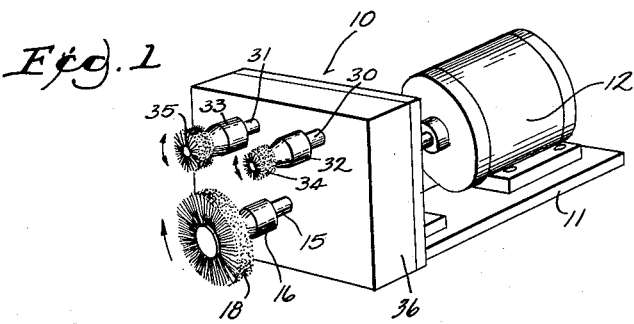
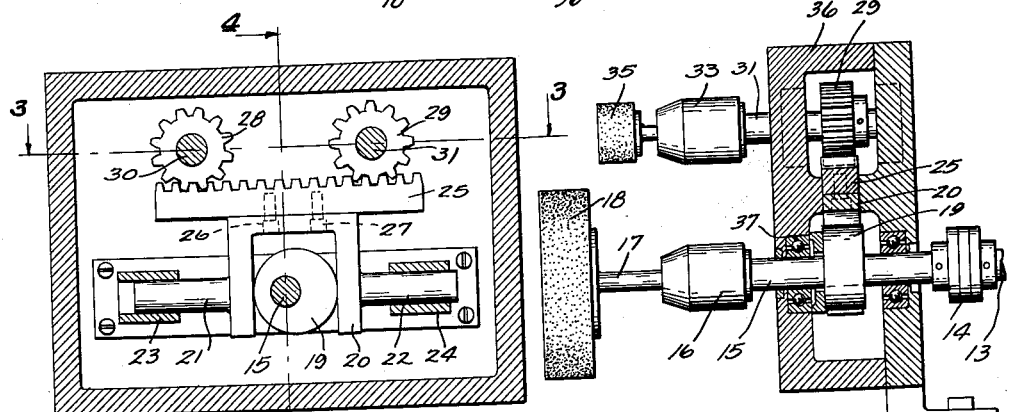
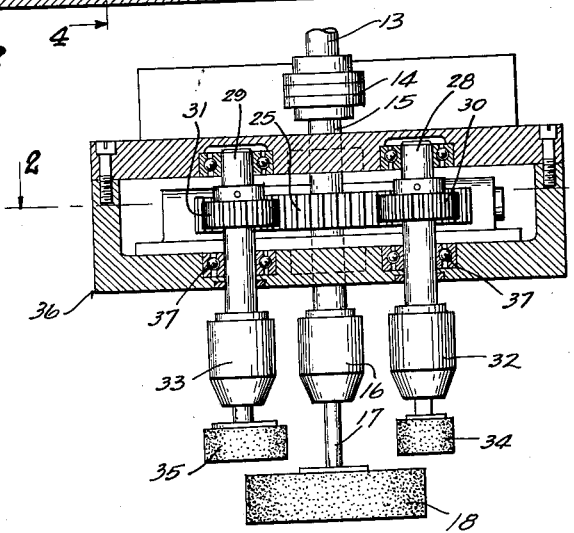
INVENTORS
CARROLL F. ROMENS
BY GEORGE A. KRALL
Gerald P. Welch
ATTORNEY

United States Patent Office 3,067,443
Patented Dec. 11, 1962

3,067,443
LIGHTWEIGHT FITTING CLEANING MACHINES
Carroll F. Romens, 8222 N. 53rd St., and George A. Krall, 8252 N. 53rd St., both of Milwaukee 23, Wis.
Filed Jan. 9, 1961, Ser. No. 81,592
1 Claim. (Cl. 15—21)

This invention relates to improvements in lightweight fitting cleaning machines, and more particularly to a novel motor operated fitting cleaning machine.

An object of the invention is to provide a device of the kind that may be utilized to quickly and efficiently clean the inside and outside of lightweight fittings employed in the plumbing trades.

Another object of the invention is to provide a device that will clean fittings by means of oscillating and rotating wire brushes.

Other and further objects of the invention will be apparent as the description proceeds, reference being had to the accompanying drawing, in which:

FIG. 1 is a view in perspective of a lightweight fitting cleaning machine embodying the invention.

FIG. 2 is a vertical sectional view taken on line 2—2 of FIG. 3.

FIG. 3 is a horizontal sectional view taken on line 3—3 of FIG. 2.

FIG. 4 is a vertical sectional view taken on line 4—4 of FIG. 2.

Referring more particularly to the drawing, the numeral 10 refers to the device generally, having a base 11 for an electric motor 12, having the shaft 13 engaged with the coupling 14 and the shaft 15 which is coupled with the bit 16 retaining the shank 17 of the rotating wire brush 18. The shaft 15 carries the eccentric cam 19 which operates to move the yoke 20 and the shafts 21 and 22 with a reciprocal movement within the bearings 23 and 24. The yoke 20 supports the rack 25 affixed thereto by the bolts 26 and 27. The rack 25 is engaged with the gears 28 and 29 which are in turn fixed to the shafts 30 and 31 which impart reciprocal movement to the clamps 32 and 33 retaining the wire brushes 34 and 35.

The casing 36 is provided with a plurality of ball bearing assemblies 37 to journal the shafts 15, 30 and 31. The wire brushes 34 and 35 are relatively small and are dissimilar in size as is appropriate for internal cleaning of small fittings used in the plumbing trade. The brush 18 is larger and adapted for cleaning of the exteriors of such fittings.

It will be understood that the device is capable of many modifications in structure and design, without departing from the spirit of the invention, within the scope of the appended claim.

Having thus described the invention, what is claimed and desired to be secured by Letters Patent of the United States, is:

A device of the character described comprising a source of power, a casing, a rotatable shaft journalled in said casing protruding therefrom at one side thereof connected with said source of power, an eccentric cam on said shaft, a yoke positioned around the cam to give motion to the yoke, a rack fixed on the top of said yoke, a pair of shafts journalled in said casing and protruding therefrom, gears connecting said pair of shafts with said rack to impart oscillative movement to the former, and wire brushes on the protruding ends of said shafts.

References Cited in the file of this patent

UNITED STATES PATENTS

| | | |
|---|---|---|
| 1,509,699 | Atchison | Sept. 23, 1924 |
| 2,859,627 | Gallop | Nov. 11, 1958 |
| 2,960,952 | Krauss | Nov. 22, 1960 |

FOREIGN PATENTS

| | | |
|---|---|---|
| 394,798 | Germany | May 2, 1924 |